US012630325B2

(12) United States Patent
Wierenga et al.

(10) Patent No.: US 12,630,325 B2
(45) Date of Patent: May 19, 2026

(54) CASE UNPACKING SYSTEM AND METHOD

(71) Applicant: DLN Integrated Systems, Inc., Byron Center, MI (US)

(72) Inventors: Daniel Wierenga, Byron Center, MI (US); Robert Clarkson, Byron Center, MI (US); Phillip Schaafsma, Byron Center, MI (US)

(73) Assignee: DLN Integrated Systems, Inc., Byron Center, MI (US)

( * ) Notice: Subject to any disclaimer, the term of this patent is extended or adjusted under 35 U.S.C. 154(b) by 554 days.

(21) Appl. No.: 18/120,604

(22) Filed: Mar. 13, 2023

(65) Prior Publication Data

US 2023/0286689 A1 Sep. 14, 2023

Related U.S. Application Data

(60) Provisional application No. 63/319,727, filed on Mar. 14, 2022.

(51) Int. Cl.
*B65B 69/00* (2006.01)
*B65F 9/00* (2006.01)

(52) U.S. Cl.
CPC ............ *B65B 69/0033* (2013.01); *B65F 9/00* (2013.01)

(58) Field of Classification Search
CPC ... B65B 69/0033; B65B 69/0041; B65F 9/00; B25J 9/1633; B25J 15/0441; B25J 15/0616
See application file for complete search history.

(56) References Cited

U.S. PATENT DOCUMENTS

| | | | | |
|---|---|---|---|---|
| 3,757,973 | A * | 9/1973 | Lambert | B65B 69/0008 414/412 |
| 7,720,567 | B2 | 5/2010 | Doke et al. | |
| 8,690,011 | B2 | 4/2014 | Adell et al. | |
| 9,457,474 | B1 * | 10/2016 | Lisso | B26D 1/45 |
| 10,329,042 | B2 | 6/2019 | Nammoto et al. | |
| 11,161,640 | B2 | 11/2021 | Nishigalto et al. | |
| 11,325,736 | B2 | 5/2022 | Gabusi et al. | |

(Continued)

FOREIGN PATENT DOCUMENTS

| | | |
|---|---|---|
| CN | 206501487 U | 9/2017 |
| CN | 109533489 A | 3/2019 |

(Continued)

*Primary Examiner* — Glenn F Myers
(74) *Attorney, Agent, or Firm* — Varnum LLP

(57) ABSTRACT

A system and method for unpacking a case are provided. The system may comprise a work surface that defines a cutting, extraction, and unloading position and a robot configured to move the cases between the respective positions. The robot may first engage and position the case in the cutting position, wherein a plurality of cutting arms cut a first pair of sides simultaneously near the case bottom. The robot rotates the case and the cutting arms cut another pair of sides simultaneously near the case bottom. The robot then moves the case from the cutting position to the extraction position, where the case bottom is retained and removed from the case. The robot then moves the bottomless case from the extraction position to the unloading position adjacent to the work surface, wherein the product inside the case is deposited into a receptacle through the open case bottom.

19 Claims, 18 Drawing Sheets

(56) References Cited

U.S. PATENT DOCUMENTS

| | | | |
|---|---|---|---|
| 11,560,249 | B2 | 1/2023 | Schaafsma et al. |
| 2005/0066627 | A1 | 3/2005 | Clark et al. |
| 2013/0125517 | A1 | 5/2013 | Denki |
| 2014/0190130 | A1 | 7/2014 | Cramer |
| 2017/0265392 | A1* | 9/2017 | Van De Vegte ..... B25J 11/0045 |
| 2019/0071267 | A1 | 3/2019 | Toshiba et al. |
| 2020/0122870 | A1* | 4/2020 | Wapinsky ............... B65B 43/52 |
| 2021/0086936 | A1* | 3/2021 | Nishigaito .......... B65B 69/0033 |
| 2021/0130025 | A1 | 5/2021 | Schaafsma et al. |

FOREIGN PATENT DOCUMENTS

| | | | |
|---|---|---|---|
| CN | 211336752 | U | 8/2020 |
| EP | 2 592 007 | A1 | 5/2013 |

* cited by examiner

CASE UNPACKING SYSTEM AND METHOD

CROSS REFERENCE TO RELATED APPLICATIONS

This application claims benefit of U.S. Provisional Application No. 63/319,727 filed Mar. 14, 2022, and entitled CASE UNPACKING SYSTEM AND METHOD, which is hereby incorporated by reference in its entirety.

TECHNICAL FIELD

The present disclosure generally relates to a system for removing products from a packaging case and more specifically to cutting and removing the case bottom and emptying products through the opened bottom of the packaging case.

BACKGROUND

Consumer products are often packaged in cases, such as cardboard boxes, for shipping and conveying purposes. Packaging products in portable cases may aid in both shipping and counting of the products housed within the case. Commonly, products are unpackaged and repacked into different containers, such as totes, bins or the like, for purposes improving portability and conveyance. The new containers may hold products in different quantities than the original product cases and may be more conducive for transfer or storage.

The process of manually unpacking products from a packed case may be difficult and time consuming for several reasons. First, the case or initial product holder must be opened without any harm to the products inside. Second, the products must be removed and separated from the case without any harm to the products, and in some instances removed one by one, which can take additional time.

While some automated processes for unpacking products from a case exist, they suffer from similar drawbacks to the related manual processes and require numerous steps that lead to longer cycle times. For at least these reasons, an improved product unpacking system and method are needed in the relevant industry.

SUMMARY

The present disclosure is directed to a case unpacking system, and more particularly a system for removing products from a packaging case and an associated method for unpacking the case. More specifically, the system and the associated method contemplate separating and removing the case bottom from the remainder of the case and emptying products into a product receptacle or tote through the void left where the case bottom was removed earlier in the process.

The case unpacking system may be configured to receive and unpack a plurality of cases. Each case in the plurality may comprise a case top, a case bottom, and a plurality of case sides that collectively define a closed interior space therebetween. Each case is configured to hold at least one product within the closed interior space.

The case unpacking system may comprise a work surface positioned at a first height. The work surface may have a thickness and may further define a bottom removal section. At the bottom removal section, the work surface defines a plurality of apertures therein, which extend through an entirety of a thickness of the work surface.

The system may further comprise at least one case movement device configured to move the cases upon the work surface. The at least one case movement device may be a robot, such as a linear industrial robot.

The system may still further comprise at least one elongated cutting arm. The at least one elongated cutting arm having a first end, a second end, and defining a blade cavity that extends between the first end and the second end. A blade is disposed within the blade cavity and moveable within the blade cavity between a first blade position proximate the first end and a second blade position proximate the second end. The at least one case movement device may receive a respective case and position the case in a cutting position proximate the at least one elongated cutting arm, such that the blade is configured to cut one or more sides of a respective case, when the blade moves between the first blade position and the second blade position. In this way, the blade separates the case bottom from the case top and the plurality of sides of the case by cutting each of the respective sides of the case at a predetermined location disposed in a bottom portion of the respective side.

The system may still further comprise a case bottom removal assembly disposed within the bottom removal section of the work surface. The case bottom removal assembly may comprise a plurality of puncture elements vertically aligned with the plurality of apertures in the work surface. The plurality of puncture elements is configured to occupy one of a retracted position below the top surface of the work surface and a deployed position. In the deployed position each puncture element is disposed within and extends upwardly through a respective aperture in the work surface. The at least one case movement device may transition or move the case, including the case top, case sides, and the separated case bottom, from the cutting position to an extraction position disposed upon the case bottom removal assembly. In the extraction position, the separated case bottom is punctured by and secured to the puncture elements. The case top, the cases sides, and the product within the closed interior space are then removed from the case bottom with a push arm, rendering the bottom of the case open, with the product secured within the interior space by the work surface.

The at least one case movement device may then move the case to an unloading position adjacent to the work surface and above a product receptacle positioned at a second height. In this way, the case top and case sides are moved off of the work surface, and the product disposed within the interior space of the case is emptied into the product receptacle via the open case bottom.

Finally, after the product is emptied from the interior space, the at least one case movement device may move the case from the unloading position to a refuse station and deposit the emptied case into a refuse container for disposal.

As partially detailed herein above, the present method comprises the following steps. First, receiving a case onto a work surface positioned at a first height; second, positioning the case in a cutting position with a case movement device; third, separating the case bottom from the case top and the plurality of sides of the case by cutting each of the respective sides of the case at a predetermined location, wherein the predetermined location is disposed proximate the respective side bottom; fourth, positioning the case in an extraction position with the case movement device; fifth, removing the bottom of the case from the case top and the plurality of sides of the case, such that a void is disposed at the case bottom; and sixth, positioning the case in an unloading position, with the case movement device, and emptying the case, via the void, such that the at least one product is emptied into a product receptacle disposed at a second height that is below the first height of the work surface.

BRIEF DESCRIPTION OF THE DRAWINGS

The embodiments set forth in the drawings are illustrative and exemplary in nature and not intended to limit the subject matter. The following detailed description of the illustrative embodiments can be understood when read in conjunction with the following drawings, where like structure is indicated with like reference numerals and in which.

DETAILED DESCRIPTION

Figure 1:
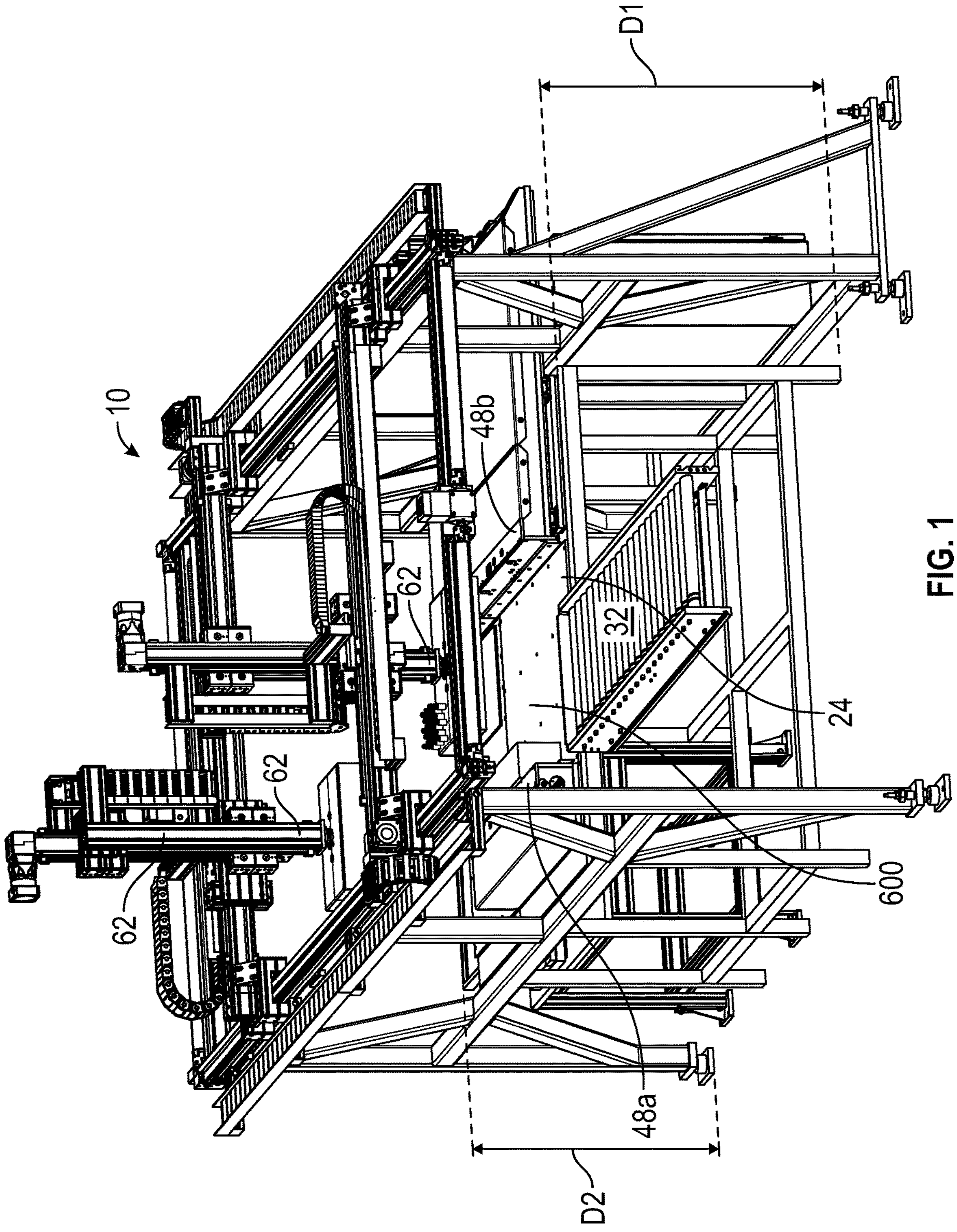
FIG. 1 is a schematic perspective view of an example case unpacking system with an integrated tote and conveyor assembly, having at least one case movement device useful in moving and distributing cases throughout the system.
Figure 2:
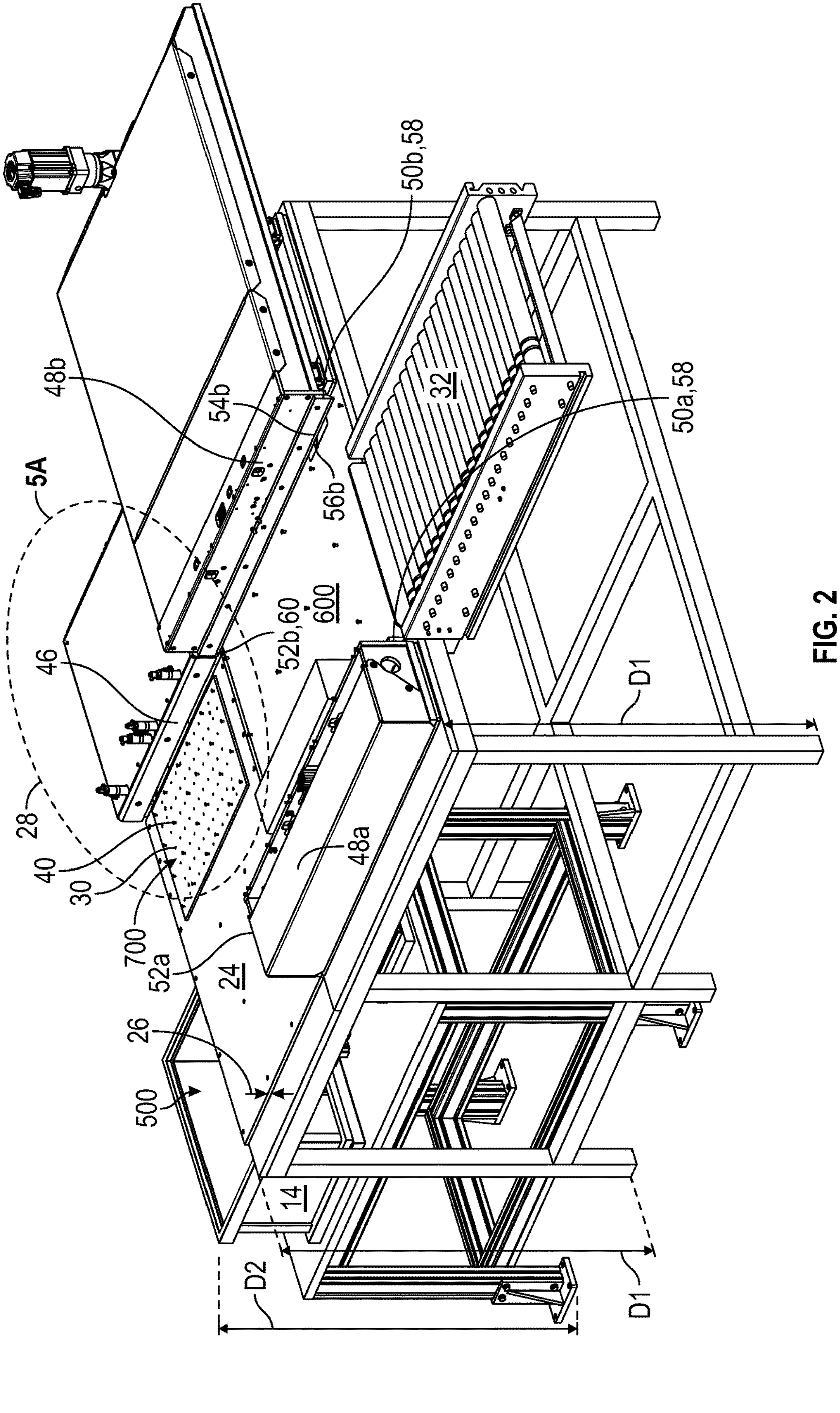
FIG. 2 is another schematic perspective view of the example case unpacking system of FIG. 1, shown without the at least one case movement device.
Figure 3:
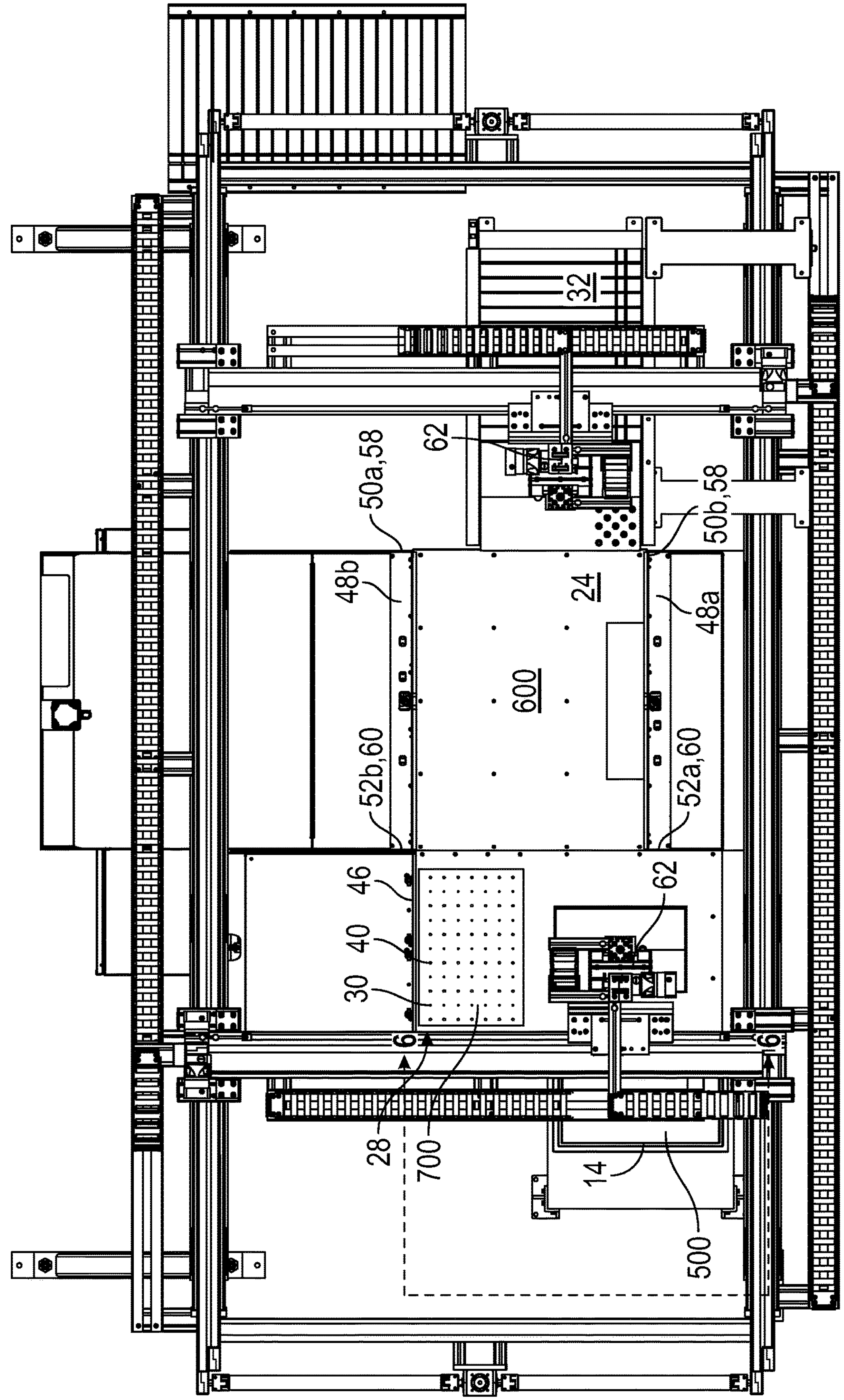
FIG. 3 is a schematic plan view of the example case unpacking system of FIG. 1.
Figure 4:
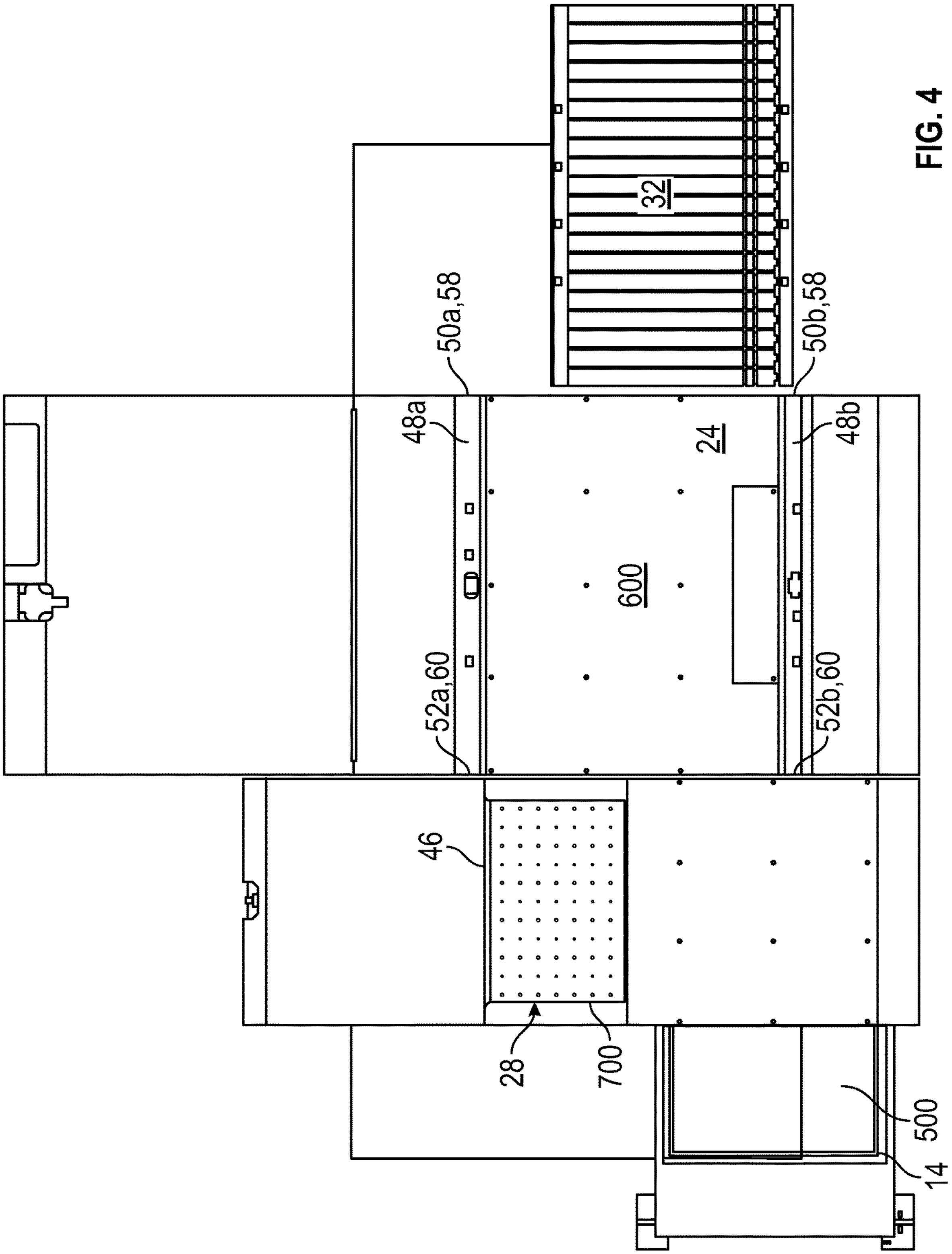
FIG. 4 is a schematic plan view of the example case unpacking system of FIG. 2.

While the present disclosure may be described with respect to specific applications or industries, those skilled in the art will recognize the broader applicability of the disclosure.

The terms “a”, “an”, “the”, “at least one”, and “one or more” are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term “about” whether or not “about” actually appears before the numerical value. “About” indicates that the stated numerical value allows some slight imprecision (with some approach to exactness in the value; approximately or reasonably close to the value; nearly). If the imprecision provided by “about” is not otherwise understood in the art with this ordinary meaning, then “about” as used herein indicates at least variations that may arise from ordinary methods of measuring and using such parameters. In addition, a disclosure of a range is to be understood as specifically disclosing all values and further divided ranges within the range.

The terms “comprising”, “including”, and “having” are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term “or” includes any one and all combinations of the associated listed items. The term “any of” is understood to include any possible combination of referenced items, including “any one of” the referenced items. The term “any of” is understood to include any possible combination of referenced claims of the appended claims, including “any one of” the referenced claims.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

For consistency and convenience, directional adjectives are employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims. Any numerical designations, such as "first" or "second" are illustrative only and are not intended to limit the scope of the disclosure in any way.

The term "longitudinal", as used throughout this detailed description and in the claims, refers to a direction extending a length of a component. In some cases, a component may be identified with a longitudinal axis as well as a forward and rearward longitudinal direction along that axis. The longitudinal direction or axis may also be referred to as an anterior-posterior direction or axis.

The term "transverse", as used throughout this detailed description and in the claims, refers to a direction extending a width of a component. The transverse direction or axis may also be referred to as a lateral direction or axis or a mediolateral direction or axis.

The term "vertical", as used throughout this detailed description and in the claims, refers to a direction generally perpendicular to both the lateral and longitudinal directions. The term "upward" or "upwards" refers to the vertical direction pointing towards a top of the component. The term "downward" or "downwards" refers to the vertical direction pointing opposite the upwards direction, toward the bottom of a component. In addition, the term "proximal" refers to a direction that is nearer and the term "distal" refers to a relative position that is further away. Thus, the terms proximal and distal may be understood to provide generally opposing terms to describe relative spatial positions.

In a general sense, the present disclosure provides a system 10 for unpacking a case 12 and an associated method 100 for unpacking the case 12 with the subject system 10. More specifically, the system 10 and the associated method 100 contemplate separating and removing the case bottom 16 from the remainder of the case and emptying products 11 into a product receptacle 14 or tote through the void 15 left where the case bottom 16 was removed earlier in the process 100. The case unpacking system 10 of the present disclosure is contemplated and described as an automated system and the associated method 100 for unpacking the case 12 with the subject system 10 is contemplated as an automated process that receives instructions from and communicates with a control strategy executing software via a system control unit.

More particularly, referring to the Figures, the case unpacking system 10 may be configured to receive and unpack a plurality of cases 12. The system 10 may receive and discard such cases after processing via a plurality of conveyors or other material handling implements 32, 34, 36. Each case 12 in the plurality may comprise a case top 18, a case bottom 16, and a plurality of case sides 55*a*-55*d*. Each of the plurality of sides 55*a*-55*d* of the respective case 12 further comprises a side top portion 21*a* and a side bottom portion 21*b*. Collectively, the case bottom 16, the case top 18, and the case sides 55*a*-55*d* define a closed interior space 22 therebetween. Each case is configured to hold at least one product 11 within the closed interior space 22. As used herein, it will be appreciated that the term case 12 may include any box or packaging container, including but not limited to, cardboard boxes, that contain one or more individual products 11. The cases 12 may have a variety of shapes, for example, a cube-like shape as shown in FIGS. 6-14B.

The dimensions or other case-specific parameters of the respective cases may be measured and/or evaluated, as the cases 12 enter the system, by a vision system or another case profiling device or via a barcode reading, scanning, or network download, or the like and sent to a system control unit, which provides instructions related to the known or measured parameters of the case 12 to the remaining system 10 components. The measured or known case parameters, as well as other automation components, control strategies, and the steps of the present method 100 may be executed by the system control unit. The system control unit may be configured to receive input signals from a variety of inputs, such a position sensor inputs and the like. The system control unit may further be configured to control outputs of the system 10, and specifically monitor and control the flow, speed, and movement of the conveyors 32, 34, 36, and the speed and movement of the case movement device 62.

The system control unit may include a non-transitory computer readable medium or a memory and a processor configured to execute the computer executable instructions or control strategies embodied in the memory that correspond to the present method 100 and other preprogrammed automation control strategies. Such a memory may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read, as well as networked versions of the same.

With reference to FIGS. 1-4, the case unpacking system 10 may comprise a workstation that includes a work surface 24 and a plurality of conveyors 32, 34, 36 that deliver and remove or discard the respective cases 12 from the work surface 24. In one example, the system 10 may include a case entry conveyor 32 configured to deliver each of the plurality of cases 12 to the work surface 24, a product receptacle conveyor 34 configured to move the product receptacle 14 toward and away from the work surface 24, and a refuse station or refuse conveyor 36 configured to receive and dispose of the emptied cases 12.

The work surface 24 may comprise a table or platform having a thickness 26 and a top surface 27 that is positioned at a first height D1. The work surface 24 may be positioned adjacent to the case entry conveyor 32 and directly adjacent and above the product receptacle conveyor 34. In one example, the case entry conveyor 32 and the product receptacle conveyor 34 are disposed on opposing sides of the work surface 24. The product receptacle conveyor 34 may be positioned at a height that is lower than the first height D1 or the height of the work surface 24 and may house product receptacles 14 thereon. A product receptacle 14 or tote, is positioned adjacent to and below the work surface 24. Said another way, the product receptacle 14 may be positioned in an unloading position 500 at a second height D2 that is shorter or less than the first height D1 of the work surface 24. In one example, the product receptacle 14 may be positioned on the product receptacle conveyor 34. The product receptacle conveyor 34 may deliver empty product receptacles or totes 14 to the unloading position 500 adjacent the work surface 24 to receive product and further configured to convey filled product receptacles 14 away from the work surface 24 as indicated by the arrows in FIG. 2. Alternatively, the product receptacle 14 or tote may be placed on a fixed table or substrate and manually moved or picked as the same reaches capacity with product 11.

The work surface 24 may further be positioned above the refuse station or refuse conveyor 36, and the refuse station 36 may be configured to receive, collect, and dispose of the emptied cases 12 as further detailed herein below and in FIGS. 14A-14B.

Figure 5A:
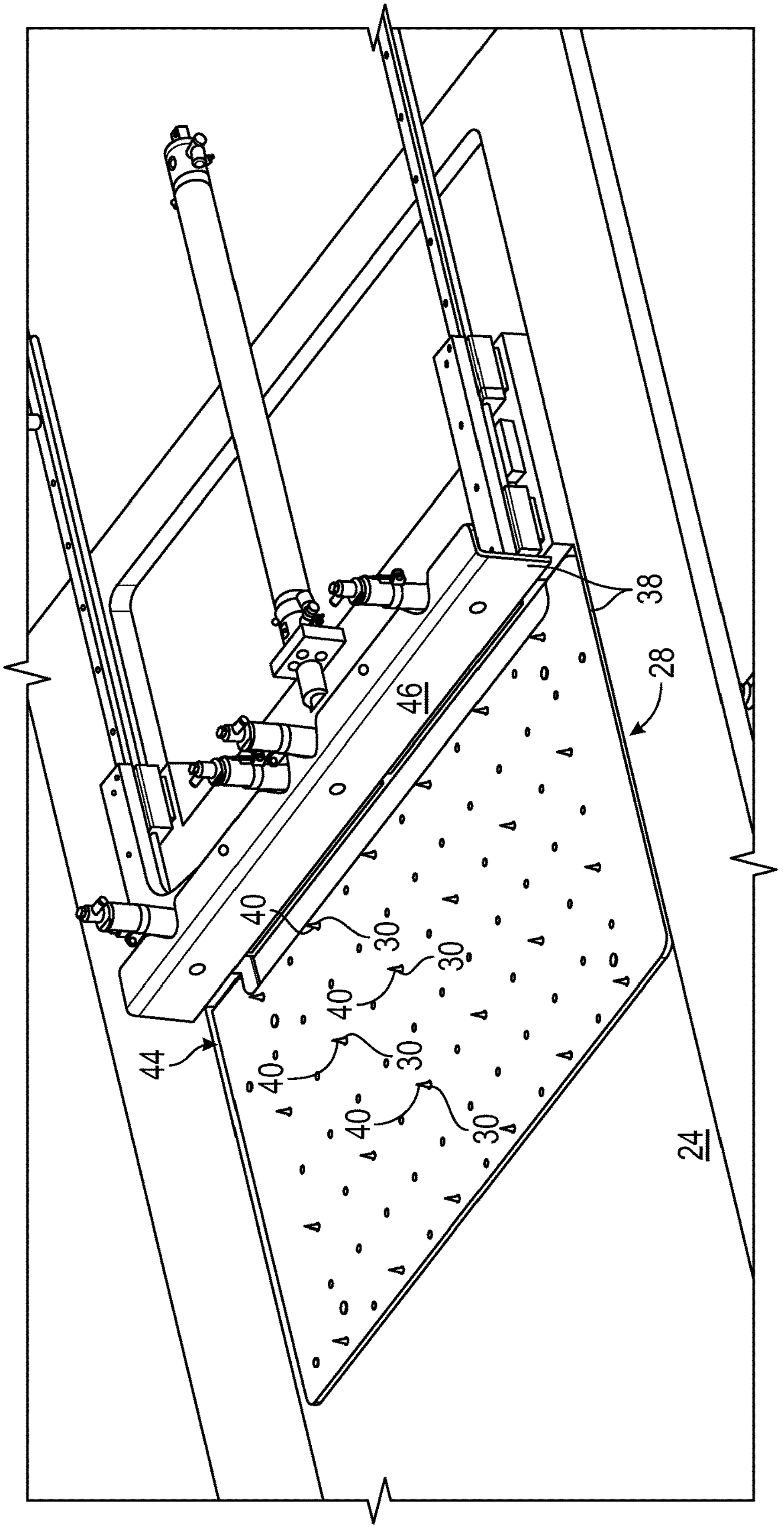
FIG. 5A is an enlarged, schematic perspective view of a portion of FIG. 2 showing the case bottom removal assembly of the of the example case unpacking system.
Figure 5B:
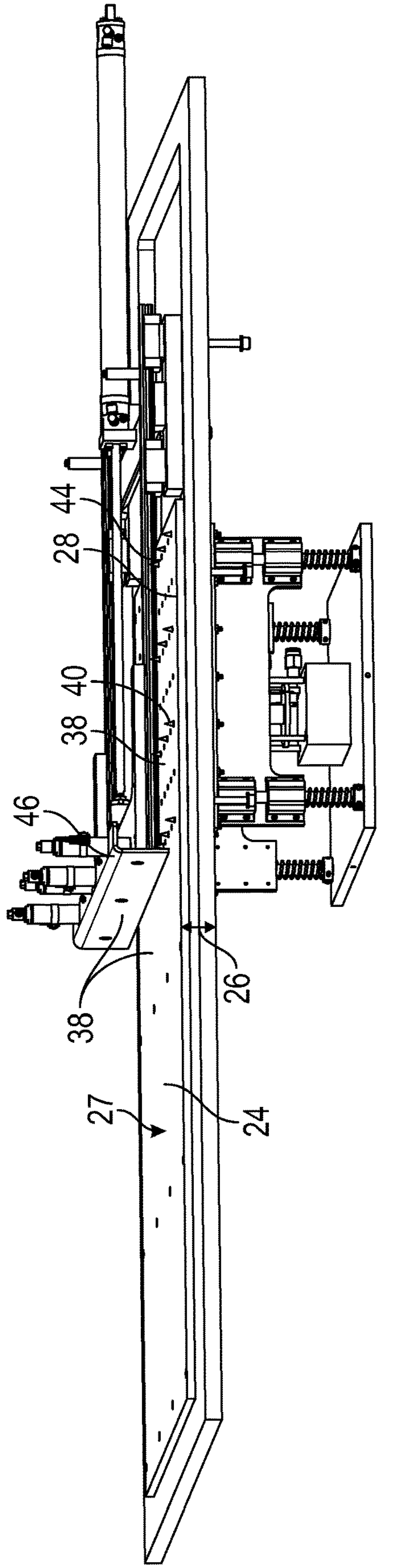
FIG. 5B is an enlarged, schematic partial cross-sectional view of the portion of FIG. 2 shown in FIG. 5A, showing the case bottom removal assembly of the of the example case unpacking system.

As shown generally in FIGS. 1-4 and specifically in FIGS. 5A-5B, the work surface 24 may further define a bottom removal section 28. At the bottom removal section 28, the work surface 24 defines a plurality of apertures 30 therein, which extend through an entirety of a thickness 26 of the work surface 24. The system 10 generally, may further include a case bottom removal assembly 38 disposed in the bottom removal section 28 of the work surface 24. The case bottom removal assembly 38 may further comprise a push arm 46 and a plurality of puncture elements 40. The plurality of puncture elements 40 may comprise a rigid material, such as a rigid polymeric material or a rigid metallic material. In one example, the plurality of puncture elements 40 is formed of a rigid metallic material. In any example, the plurality of puncture elements 40 shall be formed of a material that is sufficiently rigid to puncture an exterior substrate or case bottom 16 placed thereon, such as a cardboard case bottom 16. In any example, the plurality of puncture elements 40 shall have a length sufficient to puncture and retain the cardboard case bottom 16, but shall not have a length sufficient to cause the puncture elements 40 to penetrate the closed interior space 22 or contact any product 11 therein.

The plurality of puncture elements 40 are positioned such that the same are vertically aligned with the plurality of apertures 30 in the work surface 24. Moreover, the plurality of puncture elements 40 is configured to occupy one of a retracted position 42 (FIGS. 6-10) and a deployed position 44 (FIGS. 5A, 5B, 11, 12). In the retraced position 42, the plurality of puncture elements 40 are positioned below the top surface 27 of the work surface 24. In the deployed position 42, the plurality of puncture elements 40 are disposed above the top surface 27 of the work surface 24. More particularly, in the deployed position 42 each puncture element 40 is disposed within and extends upwardly through a respective aperture 30 in the work surface 24. As further detailed hereinbelow, when a case 12 is positioned on the case bottom removal assembly 38 the case bottom 16 is punctured by and secured to the puncture elements 40 (FIGS. 11-12).

Referring again to FIGS. 1-4, the system 10 may further comprise at least one elongated cutting arm 48*a*, 48*b*. The at least one elongated cutting arm 48*a*, 48 may comprise a first end 50*a*, 50*b* and a second end 52*a*, 52*b*, wherein the second end 52*a*, 52*b* is disposed opposite the first end 50*a*, 50*b*. As shown in FIGS. 2-4, 7-9 and 11, the at least one elongated cutting arm 48*a*, 48 may further define a blade cavity 54*a*, 54*b* therein that extends between the first end 50*a*, 50*b* and second end 52*a*, 52*b*. A cutter or blade 56*a*, 56*b* may be disposed within and moveable along the blade cavity 54*a*, 54*b* between a first blade position 58 (proximate the first end 50*a*, 50*b*) and a second blade position 60 (proximate the second end 52*a*, 52*b*).

The cutter or blade 56*a*, 56*b* may be a linear cutter. The blade 56*a*, 56*b*, within the blade cavity 54*a*, 54*b*, may be generally arranged substantially parallel to the top surface 27 of the work surface 24, or at an appropriate angle, to allow a cutting surface of the blade 56*a*, 56*b* to engage a side 55*a*-55*d* of one of the cases 12, when the case 12 is positioned such that the case bottom 16 is resting on the work surface 24 in a cutting position 600.

The blade 56*a*, 56*b* may be further adjustable along one or more axes. For example, the blade 56*a*, 56*b* may be adjustable to vary the depth of the cut into the side 55*a*-55*d* of the case 12 by adjusting the distance that the blade protrudes from the blade cavity 54*a*, 54*b*. Said another way, the blade extension length, measured from the blade tip to the blade cavity 54*a*, 54*b*, may be automatically or manually adjusted based on known or measured parameters of a respective case 12. The height of the elongated cutting arm 48*a*, 48*b* and thereby the blade 56*a*, 56*b* disposed within the blade cavity 54*a*, 54*b* thereof, may be vertically adjusted to adjust the height of the predetermined location for the cut, along the respective side 55*a*-55*d* of the case 12. Said another way, the blade height, measured from the top surface 27 of the work surface 24 to the blade 56*a*, 56*b*, may be automatically or manually adjusted based on known or measured parameters of a respective case 12. The desired blade height and blade extension length for the specified case may be stored on the memory and conveyed to the system by the system control unit.

As contemplated by the disclosure, the cutter or blade 56*a*, 56*b* may be vertically adjusted to a predetermined location, such that the blade 56*a*, 56*b* contacts the respective side 55*a*-55*d* of the respective case 12, along a predetermined cut line, in the side bottom portion 21*b*, i.e., closer to the case bottom 16 than the case top 18. In one example, the predetermined location or predetermined cut line is disposed within a bottom quarter portion of each side 55*a*-55*d*. In another more specific example, the predetermined location or predetermined cut line is disposed in the bottom portion of each side 55*a*-55*d* at or near the case bottom 16.

In one example embodiment, as shown in the Figures, the at least one elongated cutting arm 48*a*, 48*b* comprises a first elongated cutting arm 48*a* and a second elongated cutting arm 48*b*. In such an example, the first elongated cutting arm 48*a* has a first blade cavity 54*a* and a first blade 56*a* disposed within the first blade cavity 54*a*. The first blade 56*a* is further moveable along a length of the first blade cavity 54*a* between the first blade position 58 (proximate the first end 50*a*) and the second blade position 60 (proximate the second end 52*a*). In the same example, the second elongated cutting arm 48*b* has a second blade cavity 54*b* and a second blade 56*b* disposed within the second blade cavity 54*b*. The second blade 56*b* is further moveable along a length of the second blade cavity 54*b* between the first blade position 58 (proximate the first end 50*b*) and the second blade position 60 (proximate the second end 52*b*).

In the above detailed example, wherein the at least one elongated cutting arm 48*a*, 48*b* comprises a first elongated cutting arm 48*a* and a second elongated cutting arm 48*b*, the first blade 56*a* is disposed opposite the second blade 56*b*, such that the respective case 12 is disposed in a cutting position 600 between the first elongated cutting arm 48*a* and the associated first blade 56*a* and the second elongated cutting arm 48*b* and the second blade 56*b*. When the respective first elongated cutting arm 48*a* and a second elongated cutting arm 48*b* deploy to contact a first set of opposing sides of the case 12, namely a first side 55*a* and a second side 55*b*, the first blade 56*a* cuts the first side 55*a* of the case 12 and the second blade 56*b* cuts a second side 55*b* of the case 12 simultaneously as the first blade 56*a* and the second blade 56*b* move from the first blade position 58 to the second blade position 60.

When the respective first elongated cutting arm 48*a* and a second elongated cutting arm 48*b* deploy to contact a second set of opposing sides of the case, namely a third side 55*c* and a fourth side 55*d*, the first blade 56*a* cuts the third side 55*c* of the case 12 and the second blade 56*b* cuts a fourth side 55*d* of the case 12 simultaneously as the first blade 56*a* and the second blade 56*b* move from the second blade position 60 to the first blade position 58. Once the blades 56*a*, 56*b* cut each of the first side 55*a*, second side 55*b*, third side 55*c*, and fourth side 55*d* at the predetermined location or cut line, the case bottom 16 is effectively separated from the remainder of the case 12, namely, the case top 18, and the respective case sides 55*a*-55*d*, but remains inline therewith, such that the closed interior space 22 remains intact.

The system 10 may further comprise at least one case movement device 62 configured to move the cases 12 upon the work surface 24 throughout the system 10. More particularly, the at least one case movement device 62 is configured to move the cases 12 from the case delivery conveyor 32 to the work surface 24 and upon the work surface 24 between a cutting position 600, an extraction position 700, and an unloading position 500. The at least one case movement device 62 may be a robot, such as a linear industrial robot often commercially defined as a Cartesian robot or a Gantry robot. More specifically, the at least one case movement device 62 may be twin-axis servo driven Gantry robot. The at least one case movement device 62 may have a gripping end effector 64 configured to engaged or grip the case 12, via variable location and size suction based on known or measured parameters of the respective case 12.

Figure 6:
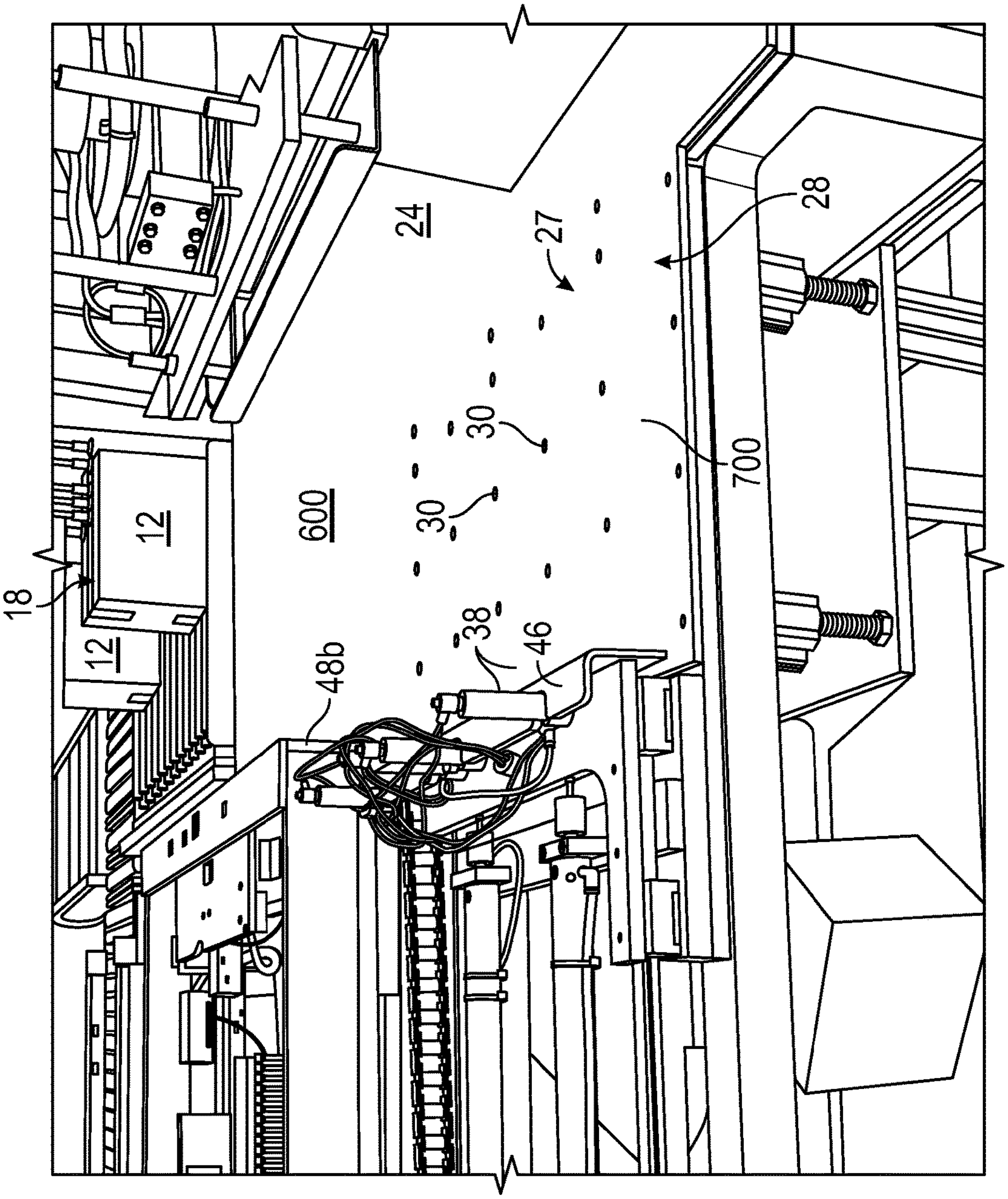
FIG. 6 is a schematic, perspective, partial cross-sectional view of a portion of the case unpacking system taken along line 6-6 in FIG. 3, wherein the case movement device retrieves a case from a case entry conveyor.
Figure 13A:
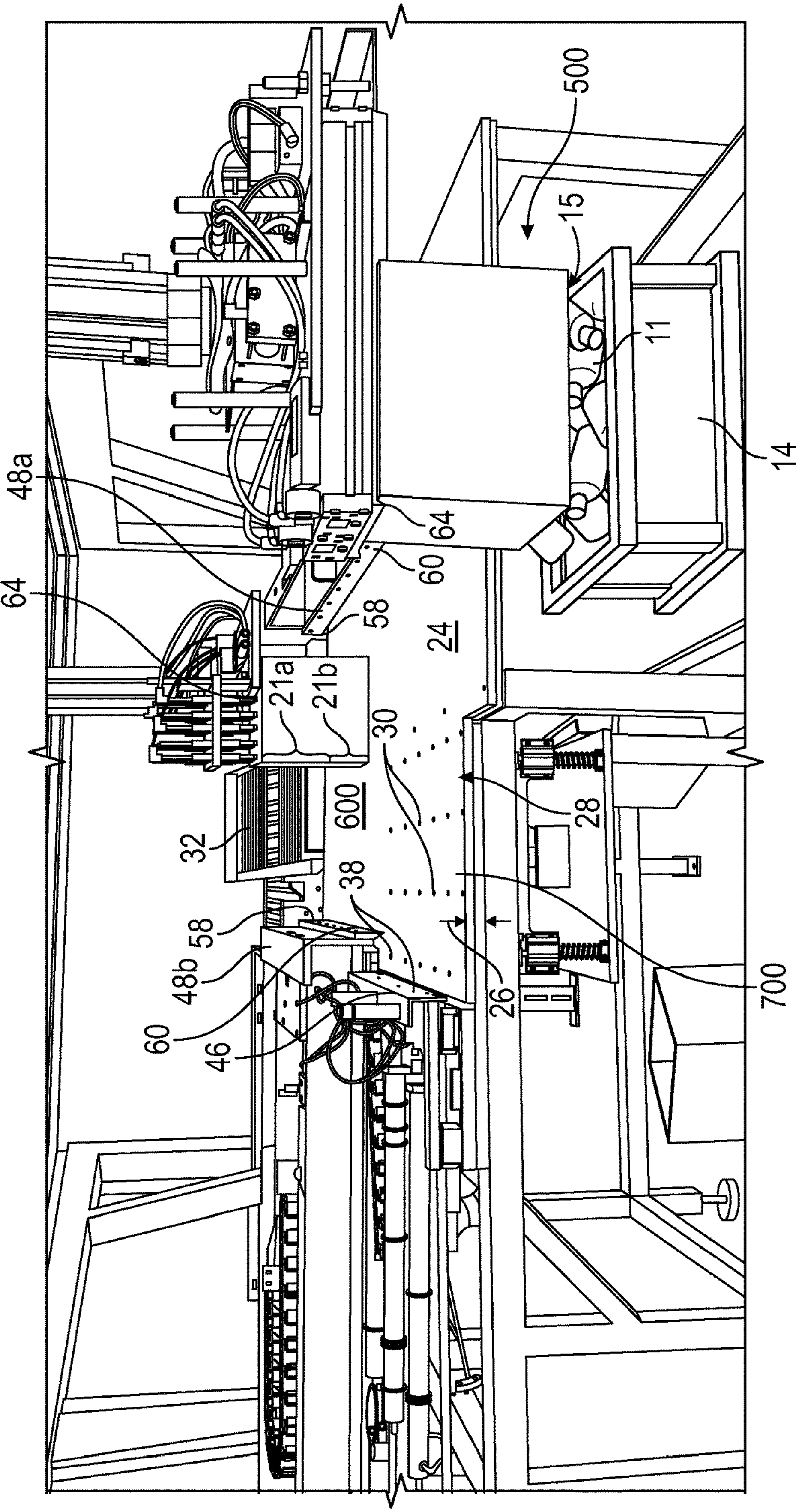
FIG. 13A a schematic, perspective, partial cross-sectional view of a portion of the case unpacking system taken along line 6-6 in FIG. 3, wherein the at least one case movement device removes the case from the work surface and positions the case in an unloading position over a product receptacle or tote positioned at a second height below the work surface and below the case.
Figure 13B:
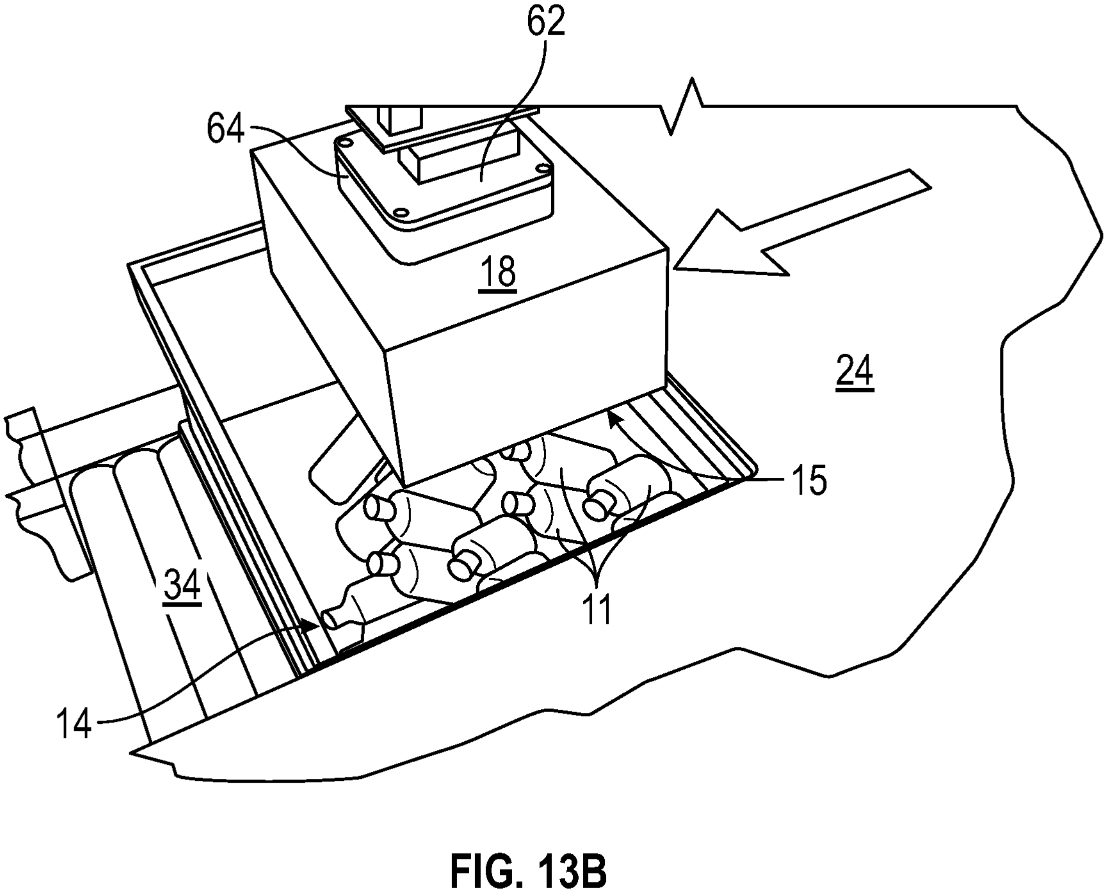
FIG. 13B a schematic, perspective view of a portion of the case unpacking system, wherein the contents of the case being emptied into the product receptacle therebelow through the open bottom of the case.
Figure 14A:
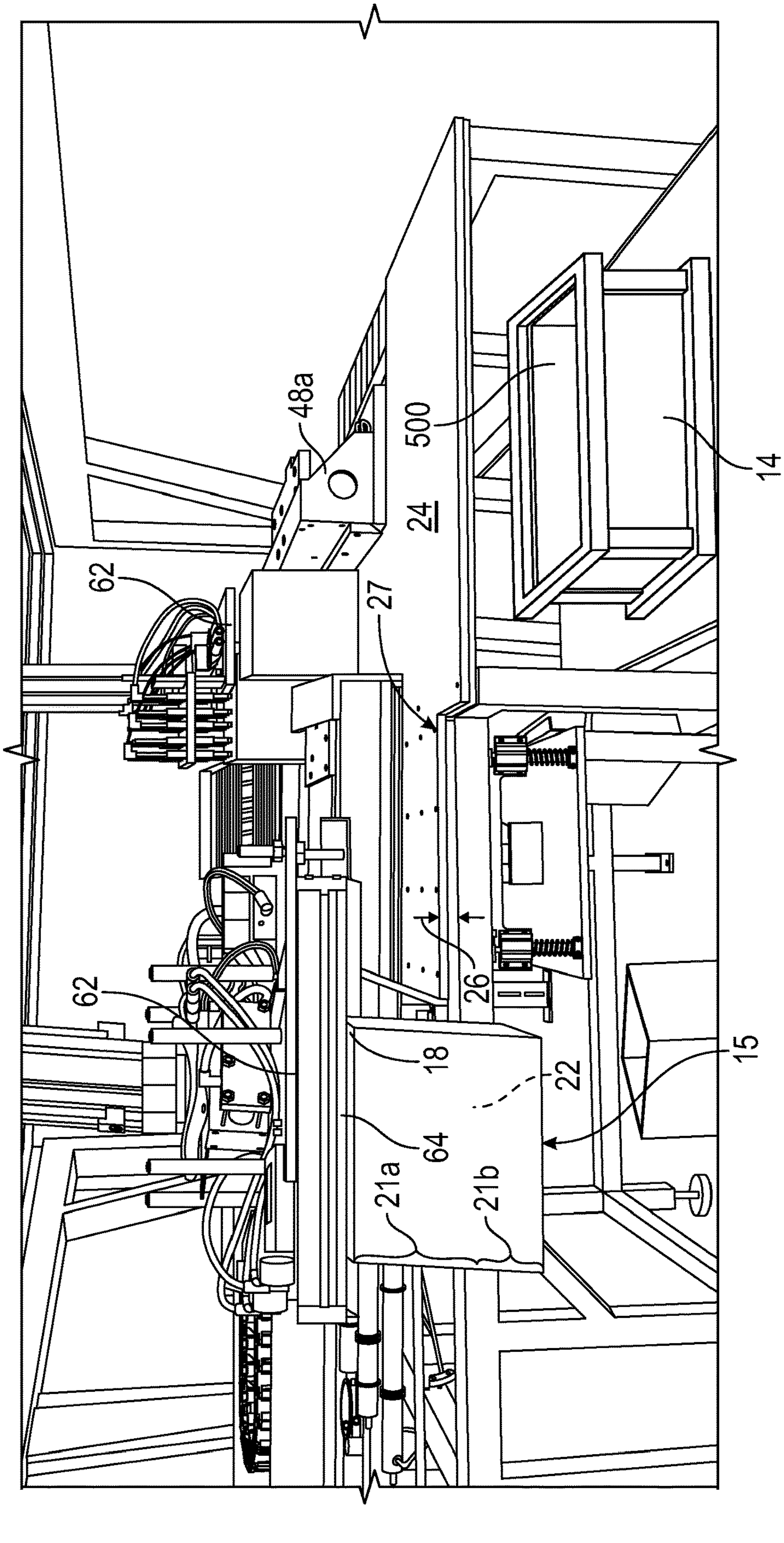
FIG. 14A a schematic, perspective, partial cross-sectional view of a portion of the case unpacking system taken along line 6-6 in FIG. 3, wherein the at least one case movement device moving the emptied case from the unloading position over the tote to a refuse station.
Figure 14B:
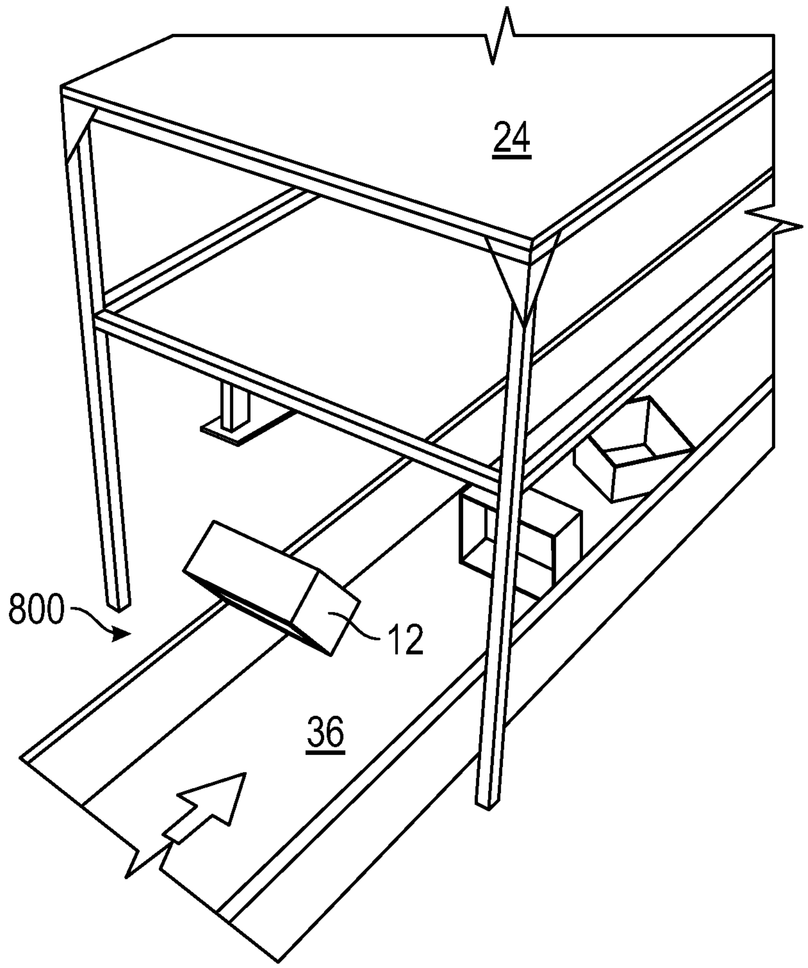
FIG. 14B is a schematic perspective view of a portion of the case unpacking system, wherein the at least one case movement device deposits the emptied case into a refuse container for disposal.
Figure 15:
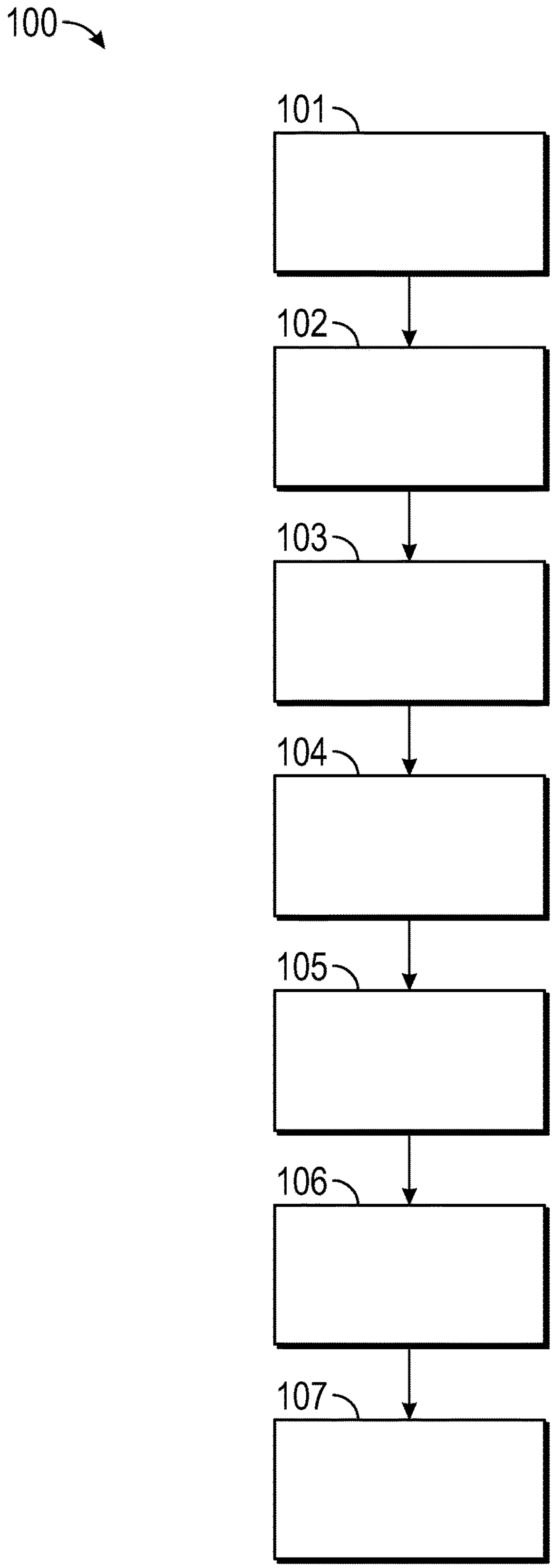
FIG. 15 is a flow chart detailing the steps of the present method of case unpacking.

Moreover, as detailed in FIGS. 6-15, a method 100 for unpacking a plurality of cases 12 with the subject case unpacking system 10 is provided. FIG. 15 details a flow chart of the present method, and each step 101-107 thereof is further detailed in FIGS. 6-14B. Referring to FIGS. 6 and 15, at Step 101, a case 12 is received from a case entry conveyor 32 and transitioned from the case conveyor 32 to the work surface 24 by the case movement device 62, wherein the work surface 24 and case entry conveyor 32 are disposed at the first height D1.

Figure 7:
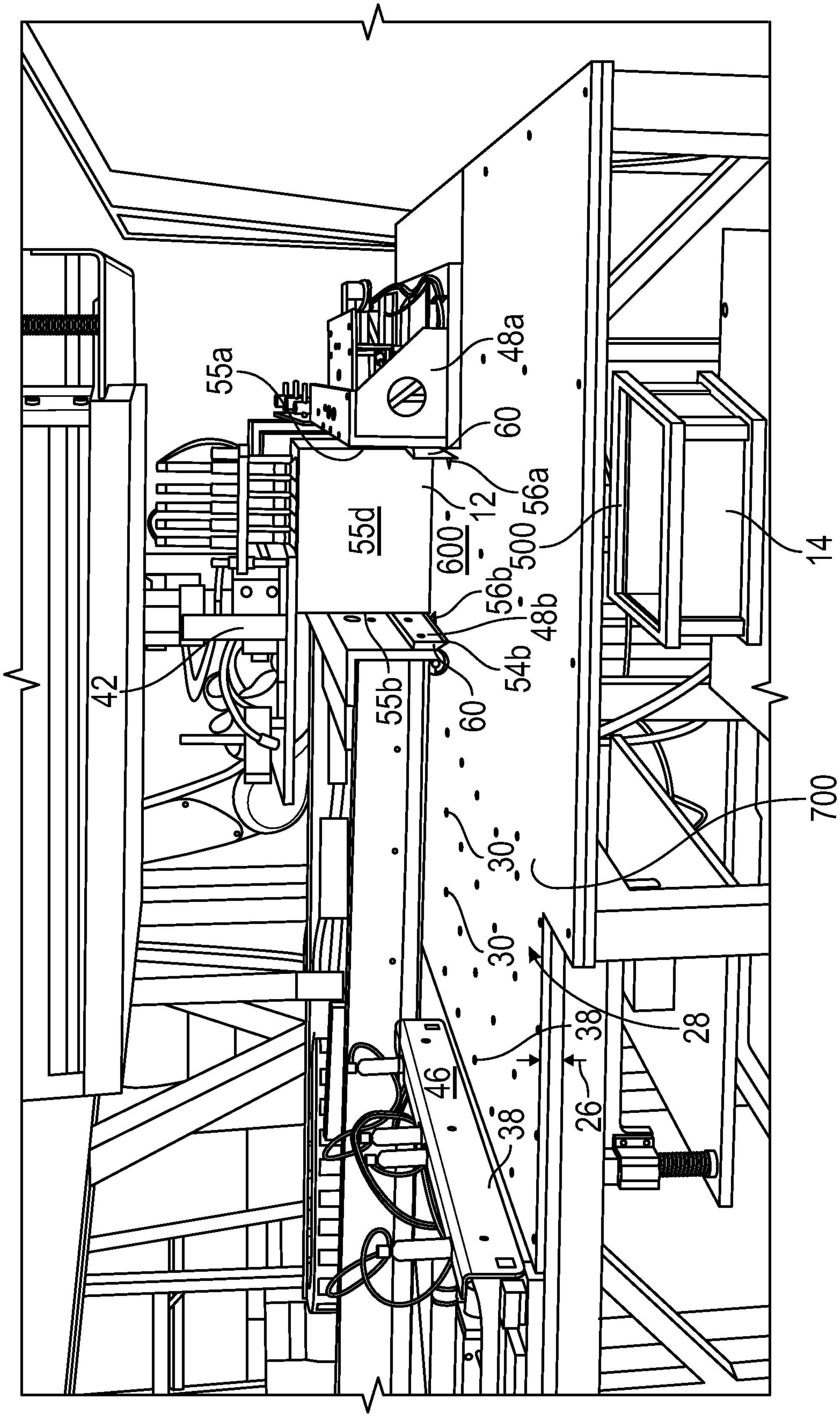
FIG. 7 a schematic, perspective, partial cross-sectional view of a portion of the case unpacking system taken along line 6-6 in FIG. 3, wherein the case movement device positions the case in a cutting position and the blades associated with the cutting arms simultaneously cut a first set of opposing sides of the case.

As detailed in FIGS. 7 and 15, at Step 102, the case 12, engaged by the case movement device 62, is moved and positioned, via sliding the case along the top 27 of the work surface 24, in the cutting position 600. The cutting position 600 is located between the first elongated cutting arm 48*a* and the associated first blade 56*a* thereof and the second elongated cutting arm 48*b* and the second blade 56*b* thereof. Accordingly, the respective case 12, when placed in the cutting position 600 by the case management device 62 is likewise disposed between the first elongated cutting arm 48*a* and the associated first blade 56*a* thereof and the second elongated cutting arm 48*b* and associated the second blade 56*b* thereof.

When the case 12 is initially moved to the cutting position 600 by the case movement device 62, the first elongated cutting arm 48*a* and the second elongated cutting arm 48*b* are retracted or positioned spaced apart from the case 12. Once the case is positioned by the case movement device 62 in the cutting position 600, the first elongated cutting arm 48*a* and the second elongated cutting arm 48*b* move to a deployed position to contact a first set of opposing sides of the case 12, namely, the first elongated cutting arm 48*a* contacts the first side 55*a* and the second elongated cutting arm 48*b* contacts the second side 55*b*.

Still referring to FIGS. 7 and 15, at Step 103, the case bottom 16 is separated from the case top 18 and the plurality of sides 55*a*-55*d*. More particularly, with the first elongated cutting arm 48*a* and the second elongated cutting arm 48*b* in a deployed position contacting the first set of opposing sides of the case, namely, the first side 55*a* and the second side 55*b*, the respective sides 55*a* and 55*b* are cut simultaneously at the predetermined location along the predetermined cut line. The first blade 56*a* cuts the first side 55*a* at the predetermined location and the second blade 56*b* cuts the second side 55*b* at the predetermined location simultaneously, as the first blade 56*a* and the second blade 56*b* move from the first blade position 58 to the second blade position 60 within the respective first blade cavity 54*a* and second blade cavity 54*b*.

Figure 8:
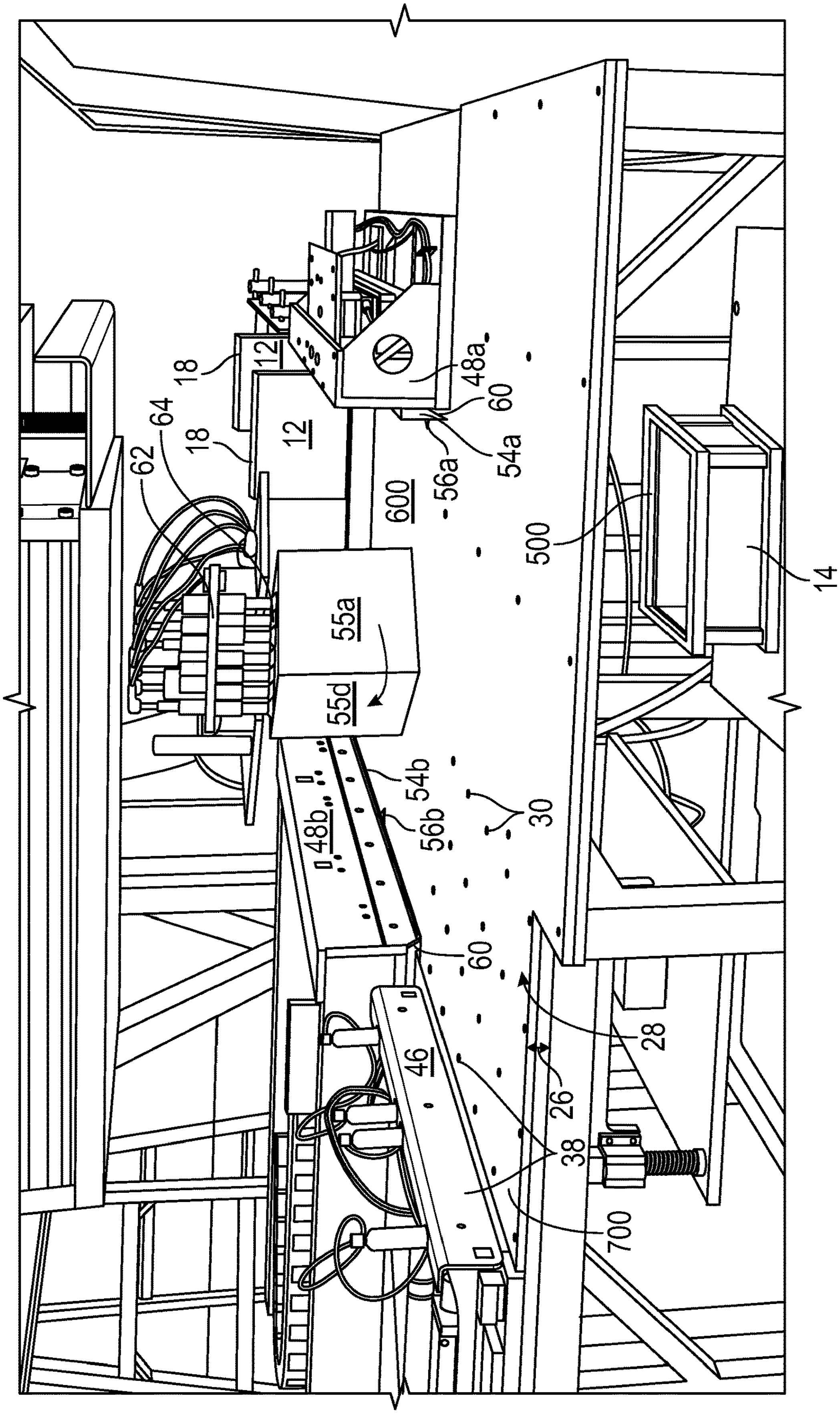
FIG. 8 a schematic, perspective, partial cross-sectional view of a portion of the case unpacking system taken along line 6-6 in FIG. 3, wherein the case remains in the cutting position and is rotated ninety (90) degrees by the at least one case movement device.

As shown in FIG. 8, once the first side 55*a* and the second side 55*b* of the case 12 are separated from the case bottom 16 along the predetermined cut line, the first elongated cutting arm 48*a* and the second elongated cutting arm 48*b* are retracted, such that they are again positioned spaced apart from the case 12. Once the first elongated cutting arm 48*a* and the second elongated cutting arm 48*b* are retracted, the case movement device 62 rotates the case 12 approximately ninety (90) degrees.

Figure 9:
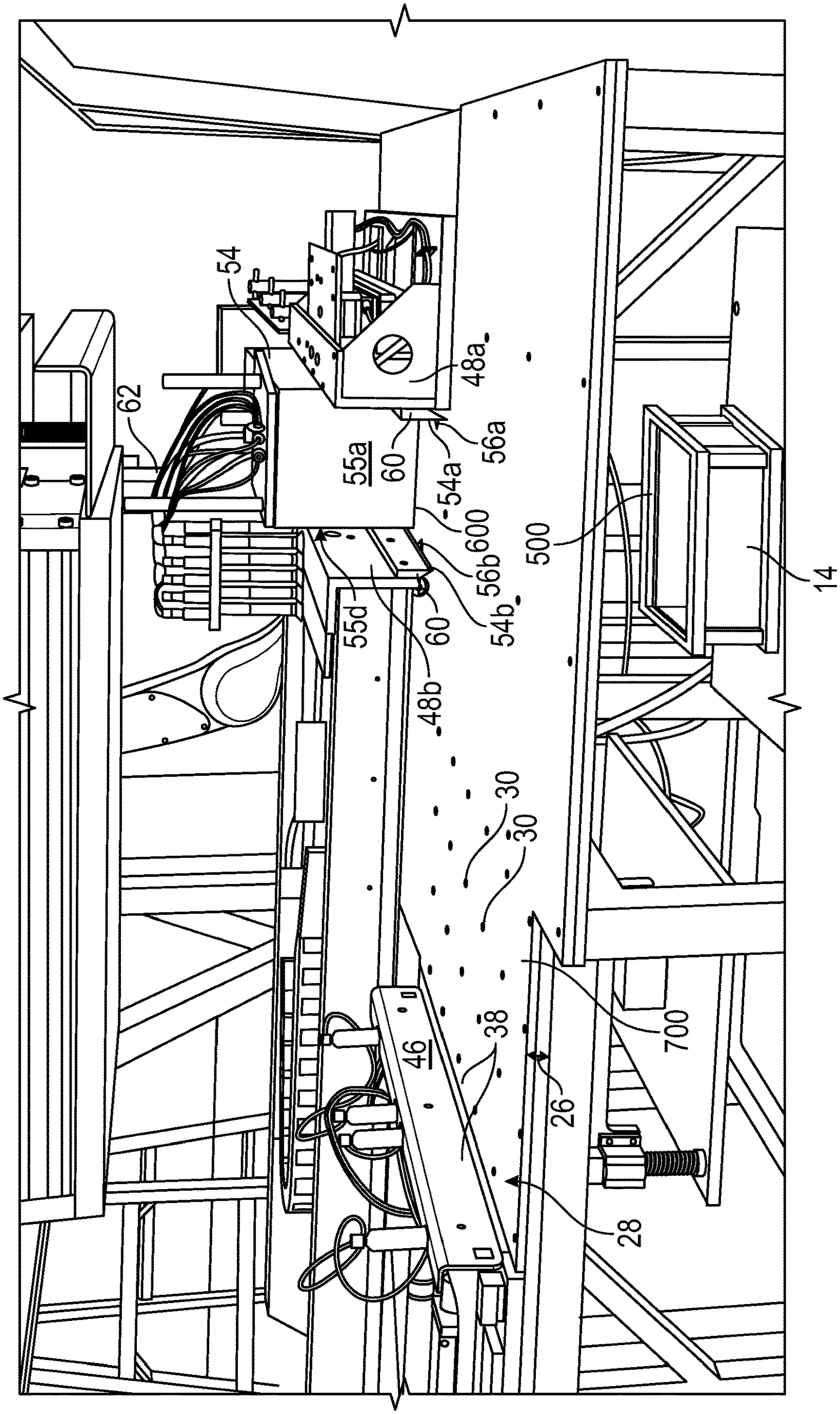
FIG. 9 a schematic, perspective, partial cross-sectional view of a portion of the case unpacking system taken along line 6-6 in FIG. 3, wherein the case remains in the cutting position, the blades associated with the cutting arms simultaneously cut a second set of opposing sides of the case.

As shown in FIG. 9, upon placement of the case 12 by the case movement device 62 in the cutting position 600, after a ninety (90) degree rotation, the first elongated cutting arm 48*a* and the second elongated cutting arm 48*b* move to a deployed position to contact a second set of opposing sides of the case 12, namely, the first elongated cutting arm 48*a* contacts the third side 55*c* and the second elongated cutting arm 48*b* contacts the fourth side 55*d*. The respective sides 55*c* and 55*d* are then cut simultaneously at the predetermined location along the predetermined cut line. The first blade 56*a* cuts the third side 55*c* at the predetermined location and the second blade 56*b* cuts the fourth side 55*d* at the predetermined location simultaneously, as the first blade 56*a* and the second blade 56*b* move from the second blade position 60 to the first blade position 58 within the respective first blade cavity 54*a* and second blade cavity 54*b*. As such, the case top 18 and all sides 55*a*-55*d* of the case 12, are effectively separated from the case bottom 16, but the respective sides 55*a*-55*d* remain in line with the case bottom 16, such that the closed interior space 22 remains intact.

As contemplated herein, the height of the blades 56*a*-56*b* and the blade extension lengths, may be adjusted based on the known or measured parameters of the case 12. However, in each case the height of the first blade 56 is substantially equivalent to the height of the second blade 56*b*. Likewise, wherein the blade extension length of the first blade 56*a* is substantially equivalent to the blade extension length of the second blade 56*b* the blades 56*a*, 56*b*. Once the blades 56*a*, 56*b* are adjusted as to height and extension length, the blades 56*a*, 56*b* contact the respective sides 55*a*-55*d*, along a predetermined cut line, in the side bottom portion 21*b*, i.e., closer to the case bottom 16 than the case top 18. In one example, the predetermined location or predetermined cut line is disposed within a bottom quarter portion of each side

55*a*-55*d*. In another more specific example, the predetermined location or predetermined cut line is disposed in the bottom portion of each side 55*a*-55*d* at or near the case bottom 16.

As shown in FIG. 10, once again, the first elongated cutting arm 48*a* and the second elongated cutting arm 48*b* are retracted, such that they are again positioned spaced apart from the case 12. As detailed at Step 104 of FIG. 15, once the first elongated cutting arm 48*a* and the second elongated cutting arm 48*b* are retracted, the case movement device 62 moves the case top 18, the respective sides 55*a*-55*d*, and the separated case bottom 16 (which is in line with the sides 55*a*-55*d*), to an extraction position 700, via sliding the case 12 on the top 27 of the work surface 24, and positions the case 12 in the bottom removal section 28 of the work surface 24 atop the bottom removal assembly 38.

At step 105 in FIG. 15, and as shown in FIGS. 11-12, the separated case bottom 16 is removed from the case top 18 and the sides 55*a*-55*d*. In this way, when the case bottom 16 is removed and an open void 15 is disposed at the case bottom 16.

More particularly, at Step 105, the system 10 actuates or transitions the plurality of puncture elements 40 from a retracted position (FIG. 10) below the top 27 of the work surface 24 to a deployed position (FIG. 11). As detailed herein, and shown in FIG. 11, in the deployed position, each puncture element 40 is disposed within and extends upwardly through a respective aperture 30 in the work surface 24 to thereby puncture the case bottom 16 and secure the case bottom 16 to the puncture elements 40 and the work surface 24 at the bottom removal section 28.

As shown in FIG. 12, while the case bottom 16 is secured to the puncture elements 40 and the work surface 24 at the bottom removal section 28 the push arm 46 is deployed to contact one of the case sides 55*a*-55*d* and push the case top 18, the respective sides 55*a*-55*d*, and the product 11 within the closed interior space 22 to extract the case bottom 16 from the same at the predetermined cutline. As such, the bottom 16 of the case is rendered open, with the product 11 secured in the interior space 22 by the top 27 of the work surface 24 in a position adjacent to the bottom removal section 28.

As shown in FIGS. 13A-13B and detailed at Step 106 in FIG. 15, the at least one case movement device 62 may then move the remaining case top 18, the respective sides 55*a*-55*d*, and the product 11 within the closed interior space 22 to an unloading position 500. The unloading position 500, is disposed adjacent to the work surface 24 and above a product receptacle 14 positioned at a second height D2. In this way, the case top 18 and case sides 55*a*-55*d* are moved off of the work surface 24, and the product 11 disposed within the interior void space 22 is emptied into the product receptacle 14 via the void 15 left by the removed case bottom 16.

Finally, as shown in FIGS. 14A-14B and detailed at Step 107 in FIG. 15, after the product 11 is emptied from the interior void space 22 into the product receptacle 14, the at least one case movement device 62 may move the intact portions of the case 12 (case top 18 and case sides 55*a*-55*d*) from the unloading position 500 to a refuse station 800 and deposit the emptied case into a refuse container for disposal. Moreover, the case movement device 62 may engage the removed case bottom 16 and move the same to the refuse station 800 and deposit the case bottom 16 into a refuse container for disposal.

Figure 10:
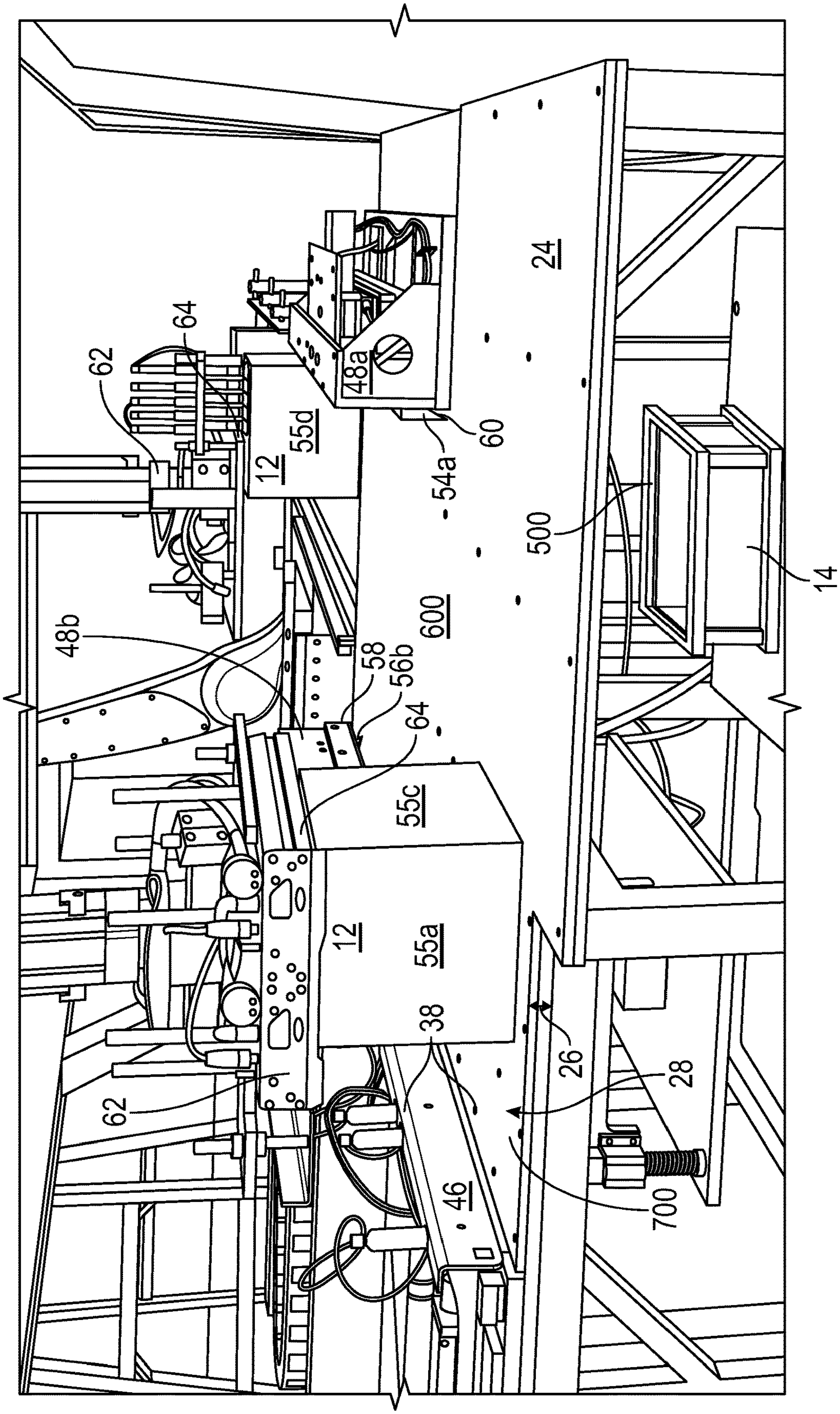
FIG. 10 a schematic, perspective, partial cross-sectional view of a portion of the case unpacking system taken along line 6-6 in FIG. 3, wherein the case movement device moves the case from the cutting position to an extraction position within the bottom removal section, such that the case is disposed upon the case bottom removal assembly.
Figure 11:
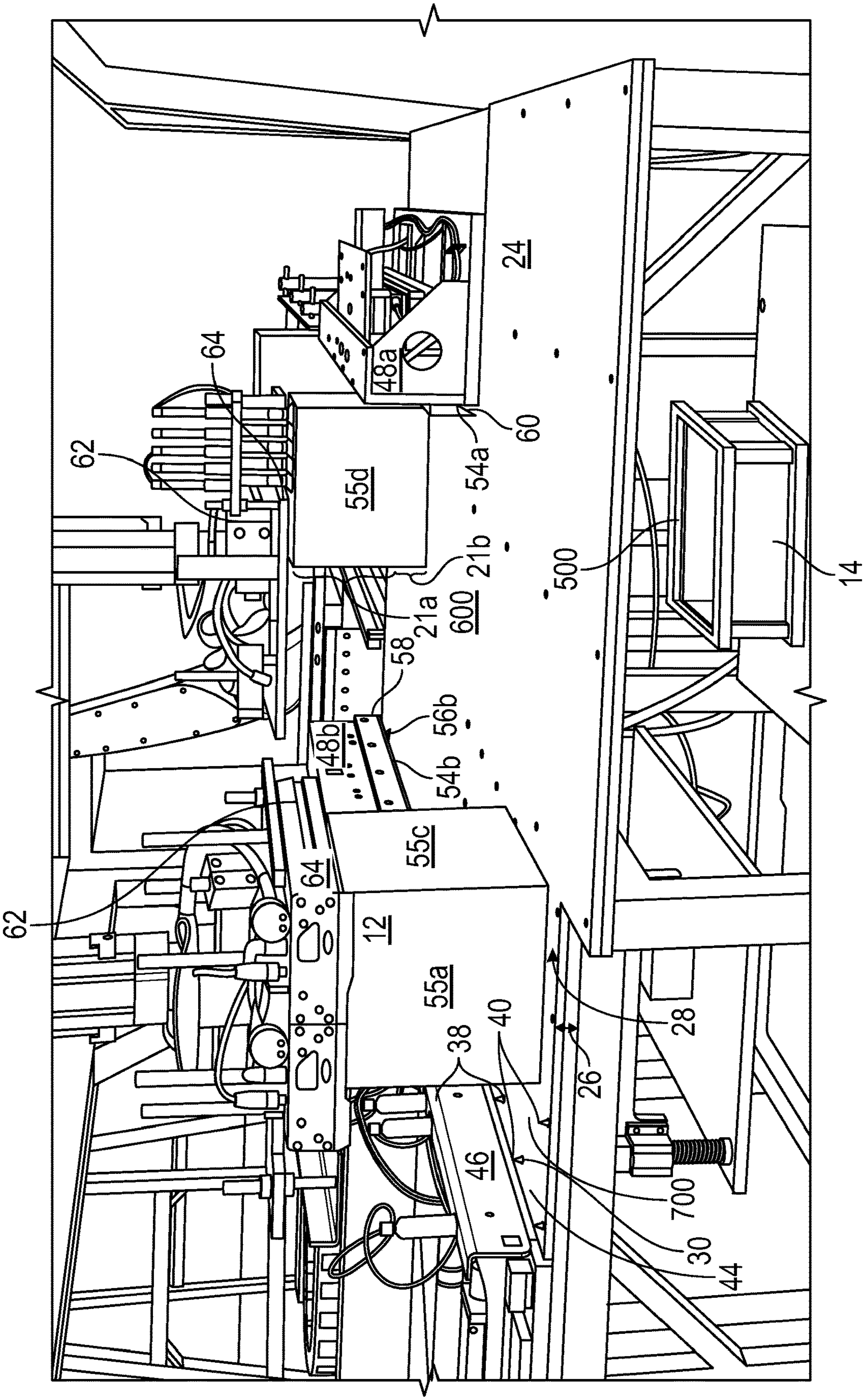
FIG. 11 a schematic, perspective, partial cross-sectional view of a portion of the case unpacking system taken along line 6-6 in FIG. 3, wherein the plurality of puncture devices of the case bottom removal assembly is deployed to puncture and secure the case bottom previously separated from the case top and respective sides by the blades.
Figure 12:
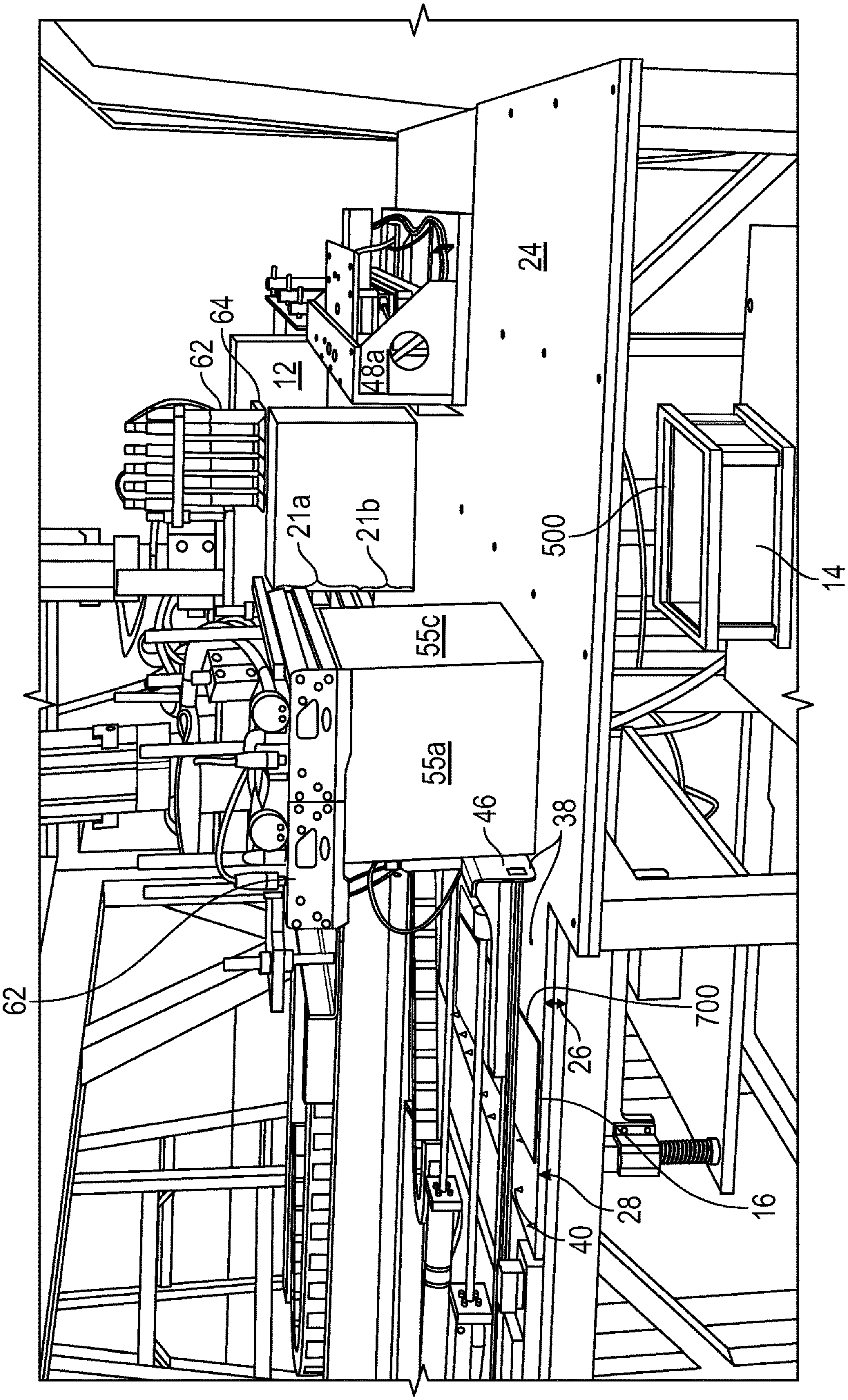
FIG. 12 a schematic, perspective, partial cross-sectional view of a portion of the case unpacking system taken along line 6-6 in FIG. 3, wherein a push arm of the case bottom removal assembly is deployed to transition the case away from the from the bottom removal section of the work surface, while retaining the case bottom on the case bottom removal assembly.

As contemplated by this disclosure, the present system 10 and method 100 may be able to accommodate for processing or unpacking multiple cases 12 at one time to further increase system efficiency and reduce cycle time (FIGS. 10-12). In one example, a first case may be disposed in the cutting position 600 and in process at step 103 and a second, but first in time, case may be disposed in the extraction position 700 and in process ahead of the first case at Step 105.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Benefits, other advantages, and solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claims.

What is claimed is:

1. A case unpacking system configured to unpack a plurality of cases, wherein each case has a case top, a case bottom, and a plurality of sides that collectively define a closed interior void space therebetween, and wherein at least one product is disposed within the closed interior void space, the system comprising:

- a work surface disposed at a first height, the work surface having a thickness and further defining a bottom removal section, wherein at the bottom removal section of the work surface defines a plurality of apertures extending through an entirety of the thickness;
- at least one case movement device configured to move the plurality of cases upon the work surface;
- at least one elongated cutting arm comprising:
  - a first end and second end, wherein the first end is opposite the second end;
  - a blade cavity extending between the first end and the second end; and
  - a blade disposed within the blade cavity and moveable within the blade cavity between a first blade position proximate the first end and a second blade position proximate the second end, such that the blade is configured to cut one or more sides of at least one of the plurality of cases when the blade moves between the first blade position and the second blade position;
- a case bottom removal assembly disposed in the bottom removal section of the work surface, the case bottom removal assembly comprising a plurality of puncture elements vertically aligned with the plurality of apertures in the work surface; and wherein the plurality of puncture elements is configured to occupy one of a retracted position below the work surface and a deployed position, wherein in the deployed position each puncture element is disposed within and extends upwardly through a respective aperture in the work surface.

2. The case unpacking system of claim 1 wherein the system is configured to adjust a blade height of the blade and a blade extension length of the blade based on known parameters of a respective case.

3. The case unpacking system of claim 2 wherein:

each of the plurality of sides of the respective case comprises a side top portion and a side bottom portion;

the blade is positioned to cut at least one of the respective sides of the respective case along a predetermined cut line; and the predetermined cut line is disposed in the side bottom portion closer to the side bottom of the respective side than the side top of the respective side.

4. The case unpacking system of claim 3 wherein the predetermined cut line is disposed within a bottom quarter portion of each side.

5. The case unpacking system of claim 3 further comprising a product receptacle positioned adjacent to the work surface at a second height, wherein the first height is greater than the second height.

6. The case unpacking system of claim 3 wherein each of the plurality of puncture elements comprises a rigid material, such that the puncture elements in the deployed position are configured to puncture and secure the case bottom thereto; and wherein the case bottom removal assembly further comprises a push arm configured to separate the case from the case bottom secured by the puncture elements.

7. The case unpacking system of claim 6 wherein the at least one elongated cutting arm further comprises:

a first elongated cutting arm having a first blade cavity and a first blade disposed within the first blade cavity;

a second elongated cutting arm having a second blade cavity and a second blade disposed within the second blade cavity;

wherein the first blade is disposed opposite the second blade, such that the first blade cuts a first side of the case and the second blade cuts a second side of the case simultaneously as the first blade and the second blade move from the first blade position to the second blade position; and the first blade cuts a third side of the case and the second blade cuts a fourth side of the case simultaneously as the first blade and the second blade move from the second blade position to the first blade position.

8. The case unpacking system of claim 1 wherein the at least one case movement device comprises at least one robot having a gripping end effector.

9. The case unpacking system of claim 8 wherein the at least one robot comprises at least one linear industrial robot.

10. The case unpacking system of claim 1 further comprising:

a case entry conveyor configured to deliver each of the plurality of cases to the work surface;

at least one product receptacle exit conveyor configured to move the product receptacle away from the work surface; and at least one refuse station configured to receive the case top and the respective sides of the case after the case bottom has been removed and the at least one product emptied into the product receptacle.

11. A method of case unpacking comprising:

receiving a case onto a work surface positioned at a first height, wherein the case has a case bottom, a case top, and a plurality of case sides that collectively define a closed interior space therebetween, each of the plurality of case sides of the respective case comprising a side top and a side bottom, and wherein at least one product is disposed within the closed interior space;

positioning the case in a cutting position between a first elongated cutting arm and an opposite second elongated cutting arm with a case movement device, wherein:

the first elongated cutting arm comprises a first end and an opposite second end, a first blade cavity extending between the first end and the second end, and a first blade disposed within the first blade cavity and moveable within the first blade cavity between a first blade position proximate the first end and a second blade position proximate the second end; and the second elongated cutting arm comprises a first end and an opposite second end, a second blade cavity extending between the first end and the second end, and a second blade disposed within the second blade cavity and moveable within the second blade cavity between a first blade position proximate the first end and a second blade position proximate the second end;

separating the case bottom from the case top and the plurality of sides of the case by cutting each of the respective sides of the case along a predetermined cut line, wherein the predetermined cut line is disposed closer to the respective side bottom of the respective side than the side top of the respective side;

positioning the case in an extraction position with the case movement device;

removing the bottom of the case from the case top and the plurality of sides of the case, such that a void is disposed at the case bottom; and positioning the case in an unloading position, with the case movement device, and emptying the case, via the void, such that the at least one product is emptied into a product receptacle disposed at a second height at the unloading position, wherein the first height is greater than the second height.

12. The method of claim 11 wherein the case movement device comprises a plurality of linear industrial robots, wherein each linear industrial robot comprises an end effector configured to provide variable location and suction size based on known parameters of the case.

13. The method of claim 11 wherein separating the case bottom from the case top and the plurality of sides of the case by cutting each of the respective sides of the case along a predetermined cut line, further comprises cutting the each of the respective sides of the case with the first blade and the second blade along the predetermined cut line as the first blade and the second blade move between the first blade position and the second blade position; and wherein the predetermined cut line is disposed with a bottom quarter of each side.

14. The method of claim 13 wherein separating the case bottom from the case top and the plurality of sides of the case by cutting each of the respective sides of the case along a predetermined cut line further comprises:

cutting a first side of the case with the first blade along the predetermined cut line and cutting a second side of the case with the second blade along the predetermined cut line simultaneously as the first blade and the second blade move from the first blade position to the second blade position;

rotating the case ninety (90) degrees with the case movement device; and cutting a third side of the case with the first blade along the predetermined cut line and cutting a fourth side of the case with the second blade along the predetermined cut line simultaneously as the first blade and the second blade move from the second blade position to the first blade position.

15. The method of claim 14 further comprising adjusting a height of the first blade and a height of the second blade and adjusting a blade extension length of the first blade and a blade extension length of the second blade based on known parameters of the case;

wherein the height of the first blade is equal to the height of the second blade; and wherein the blade extension length of the first blade is equal to the blade extension length of the second blade.

16. The method of claim 11 wherein positioning the case in an extraction position further comprises positioning the case upon a case bottom removal assembly, wherein the case bottom removal assembly comprises a plurality of puncture elements vertically aligned with a plurality of apertures in the work surface.

17. The method of claim 16 wherein removing the case bottom from the case top and the plurality of sides of the case further comprises:

actuating the plurality of puncture elements from a retracted position below the work surface to a deployed position, wherein in the deployed position each puncture element is disposed within and extends upwardly through a respective aperture in the work surface to thereby puncture and secure the bottom of the case to the puncture elements and the work surface; and extracting the bottom of the case from the case top and the plurality of sides of the case by moving the case from the extraction position upon the case bottom removal assembly to a transitional position adjacent to the case bottom removal assembly with a push arm.

18. The method of claim 17 further comprising discarding the case bottom.

19. The method of claim 18 further comprising moving the emptied case, with the case movement device, from the unloading position to a refuse station and depositing the emptied case into a refuse container for disposal.

* * * * *